(12) United States Patent
Chien

(10) Patent No.: US 8,077,148 B2
(45) Date of Patent: Dec. 13, 2011

(54) SOLAR POWERED MOUSE

(75) Inventor: Chien-Pang Chien, Taipei (TW)

(73) Assignee: Primax Electronics Ltd., Taipei (TW)

( * ) Notice: Subject to any disclaimer, the term of this patent is extended or adjusted under 35 U.S.C. 154(b) by 775 days.

(21) Appl. No.: 12/140,729

(22) Filed: Jun. 17, 2008

(65) Prior Publication Data

US 2009/0184925 A1    Jul. 23, 2009

(30) Foreign Application Priority Data

Jan. 18, 2008   (TW) ............... 97101888 A

(51) Int. Cl.
*G09G 5/08* (2006.01)
*G06F 3/033* (2006.01)
(52) U.S. Cl. ..................................... 345/163
(58) Field of Classification Search ........... 345/163–167
See application file for complete search history.

(56) References Cited

U.S. PATENT DOCUMENTS

| | | | |
|---|---|---|---|
| 6,777,916 B2* | 8/2004 | Yang | 320/146 |
| 2002/0061739 A1* | 5/2002 | Nakamura et al. | 455/343 |
| 2003/0095101 A1* | 5/2003 | Jou | 345/163 |
| 2006/0007151 A1* | 1/2006 | Ram | 345/163 |
| 2007/0132733 A1* | 6/2007 | Ram | 345/163 |

\* cited by examiner

*Primary Examiner* — Stephen Sherman
(74) *Attorney, Agent, or Firm* — Kirton & McConkie; Evan R. Witt

(57) ABSTRACT

The present invention relates to a solar powered mouse. The solar powered mouse includes a mouse body, an optical sensor, an internal light source, a secondary battery, a lens and a power management device. The lens is arranged on the mouse body for focusing the external light beams on a solar energy module of the power management device. The light energy of these light beams can be converted into electricity required for charging the secondary battery of the solar powered mouse.

6 Claims, 3 Drawing Sheets

SOLAR POWERED MOUSE

FIELD OF THE INVENTION

The present invention relates to a mouse, and more particularly to a mouse that can use solar power to charge a secondary battery.

BACKGROUND OF THE INVENTION

With rapid development of electronic and information industries, computers and the peripheral device thereof become essential parts in our daily lives. For example, mice are important peripheral devices of computers for establishing contact between the personal computers and the users. For helping the user well operate the computer, many novel mice with expanded functions are developed in views of humanization and user-friendliness.

Recently, a solar powered mouse has been developed. Such a solar powered mouse uses solar energy as the main power source. Referring to FIG. 1, a schematic view of a conventional solar powered mouse is illustrated. As shown in FIG. 1, the conventional solar powered mouse 10 includes a mouse body 11. The front side of the mouse body 11 is provided with two click buttons 12 and a scroll wheel 14 between these two click buttons 12. When click buttons 12 and the scroll wheel 14 are manipulated by a user, corresponding signals are generated to trigger the solar powered mouse. Moreover, a solar energy module 13 is arranged in front of the click buttons 12. The solar energy module 13 can absorb external light beams and convert the light beams into electric energy. The electric energy is usually sufficient for powering the solar powered mouse 10, so that no battery is contained in the solar powered mouse 10.

The conventional solar powered mouse 10, however, still has some drawbacks. For example, because of the relatively large area of the solar energy module 13, the overall appearance of the solar powered mouse 10 is aesthetically undesirable. In addition, the efficiency of absorbing solar energy or other light beams by the solar energy module 13 is usually insufficient. That is, the speed of generating electric energy by the solar energy module 13 is ultimately smaller than that of consuming electric energy by the solar powered mouse 10 over a prolonged use period. Therefore, the electric energy is not enough to work the solar powered mouse 10. Since no battery is included in the solar powered mouse, the solar powered mouse 10 can not work until the accumulated electric energy of the solar energy module 13 is sufficient to drive the solar powered mouse 10. It is very troublesome for the user to operate the solar powered mouse because the electric energy fails to be continuously supplied.

Therefore, there is a need of providing an improved solar powered mouse to obviate the drawbacks encountered from the prior art.

SUMMARY OF THE INVENTION

The present invention relates to a mouse, and more particularly to a mouse that can use solar power and manage a charging process of a mouse battery.

In accordance with an aspect of the present invention, there is provided a solar powered mouse. The solar powered mouse includes a mouse body, an optical sensor, an internal light source, a secondary battery, a lens and a power management device. By sensing movement of the mouse body, the optical sensor generates a cursor control signal. The internal light source emits internal light beams to be received by the optical sensor. The secondary battery is used for powering the mouse. The lens is arranged on the mouse body such that external light beams are permissible to enter an interior of the mouse body through the lens. The power management device is disposed within the mouse body for charging the secondary battery. The power management device includes a solar energy module, a voltage detector and a charging module. The a solar energy module disposed on a position permissible to receive the internal light beams and the external light beams, so that the internal light beams and the external light beams are converted by the solar energy module into output electricity. The voltage detector is used for detecting a voltage level Vs of the output electricity. The charging module is electrically connected to the voltage detector. The charging module is activated to charge the secondary battery with the output electricity if the voltage level Vs is greater than or equal to a preset voltage value Vth.

In an embodiment, the solar powered mouse further includes two click buttons and a scroll wheel between the two click buttons, wherein the lens is arranged adjacent to the scroll wheel.

In an embodiment, the solar powered mouse further includes a diode, which is interconnected between the charging module and the secondary battery, for allowing unidirectional current flow between the charging module and the secondary battery.

Preferably, the internal light source is a light emitting diode (LED).

In an embodiment, the power management device further includes a capacitor between the solar energy module and the voltage detector.

In an embodiment, if the surplus capacity of the secondary battery is greater than or equal to a predetermined battery capacity value, the charging module charges the capacitor with the output electricity. Whereas, if the surplus capacity of the secondary battery is smaller than the predetermined battery capacity value, the charging module charges the secondary battery with the output electricity.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For obviating the drawbacks encountered from the prior art, the present invention provides an improved solar powered mouse. A battery is mounted within the mouse body for offering electric energy to power the mouse. In comparison with the conventional technique of directly using the solar energy to power the mouse, the solar energy is used to charge the battery within the solar powered mouse of the present invention.

Figure 1:
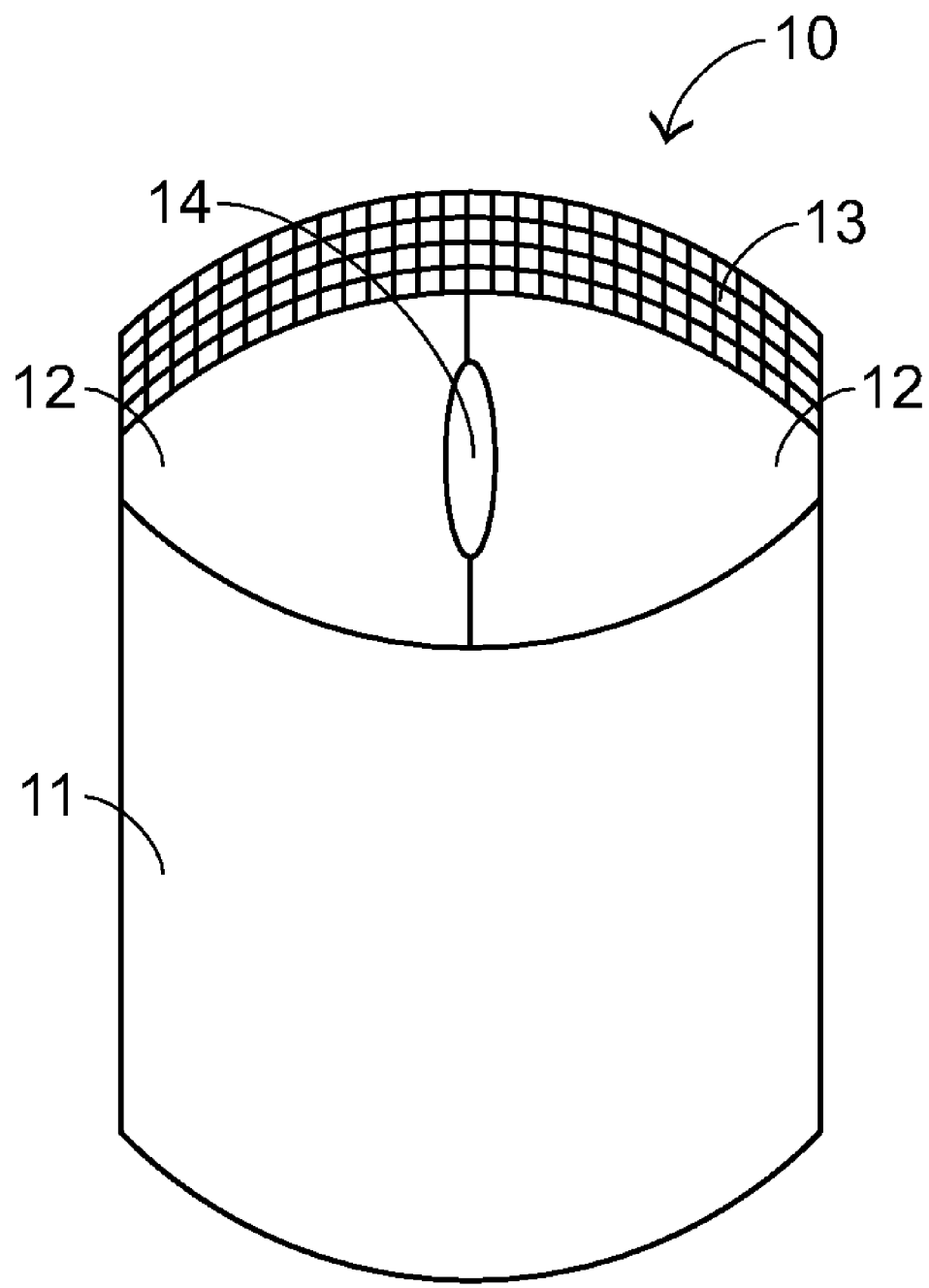
FIG. 1 is a schematic view of a conventional solar powered mouse.
Figure 2:
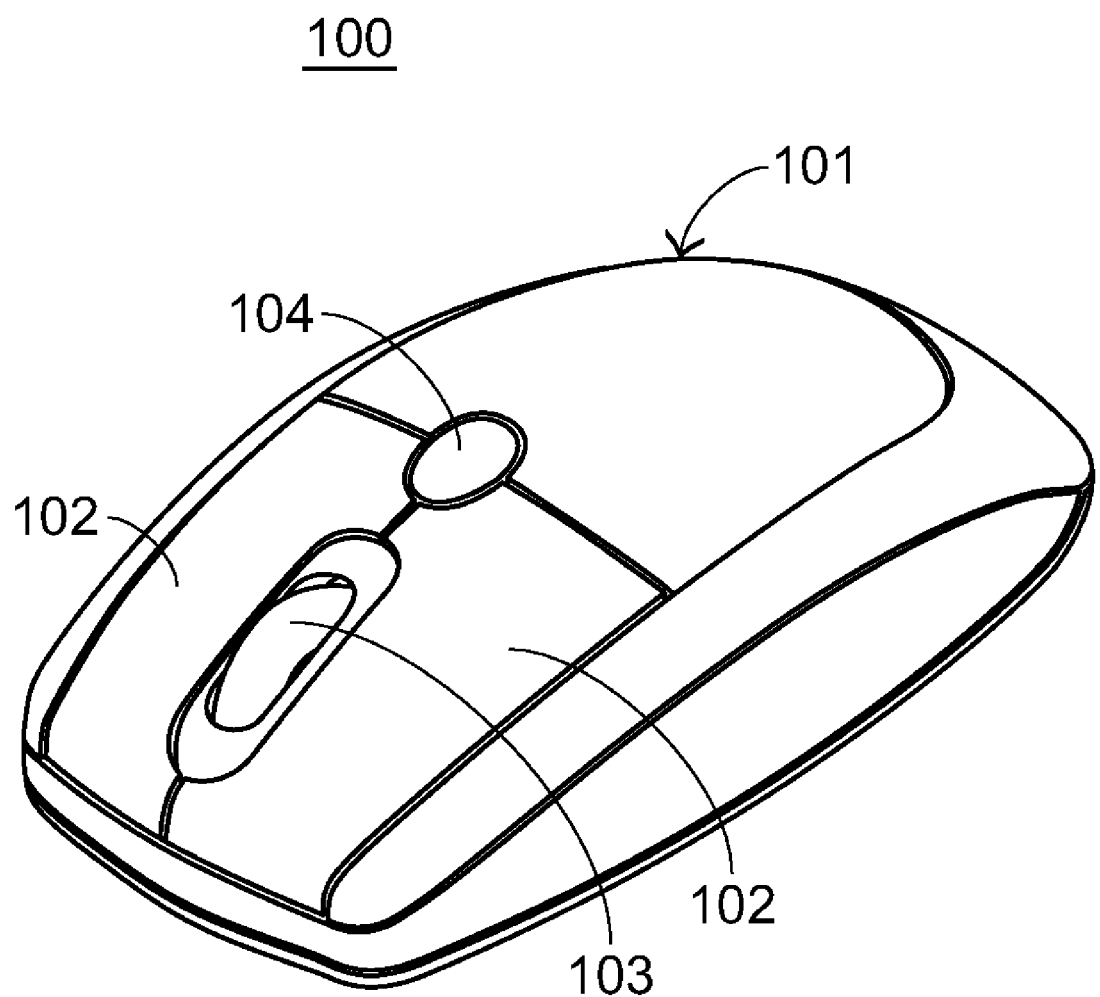
FIG. 2 is a schematic outside view of a solar powered mouse according to a preferred embodiment of the present invention.
Figure 3:
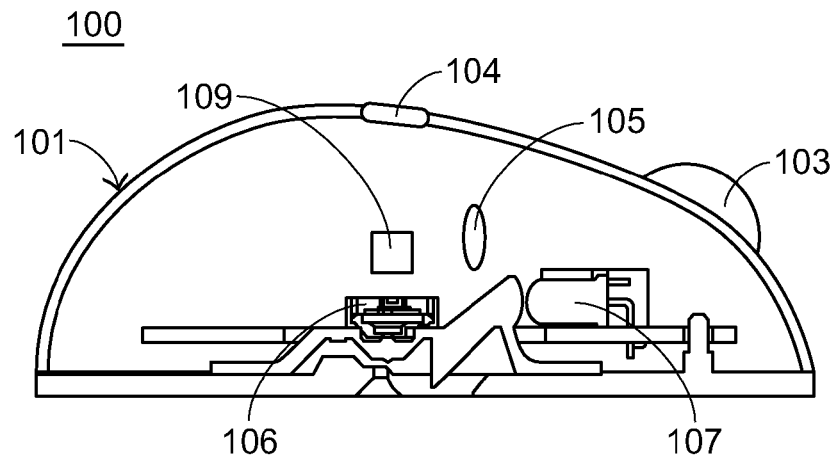
FIG. 3 is a schematic cross-sectional view illustrating the internal components of a solar powered mouse according to a preferred embodiment of the present invention.

Referring to FIG. 2, a schematic outside view of a solar powered mouse according to a preferred embodiment of the present invention is illustrated. As shown in FIG. 2, the solar powered mouse 100 principally includes a mouse body 101, two click buttons 102, a scroll wheel 103 and an exterior lens 104. These two click buttons 102 are disposed on the front side of the mouse body 101. The scroll wheel 103 is arranged between these two click buttons 102. In accordance with a key feature of the present invention, the exterior lens 104 is disposed adjacent to the click buttons 102 and the scroll wheel 103. The sun's rays or other external light beams passing through the exterior lens 104 will be converged or focused on a solar energy module 109 (as shown in FIG. 3) within the mouse body 101. As a consequence, the performance of the solar energy module 109 is enhanced by the exterior lens 104.

In addition to the external light beams, any light energy from diverse light sources can be used in the solar powered mouse 100 of the present invention. FIG. 3 is a schematic cross-sectional view illustrating the internal components of the solar powered mouse 100. Please refer to FIG. 2 and FIG. 3. The solar powered mouse 100 includes the mouse body 101, the two click buttons 102, the scroll wheel 103, the exterior lens 104 and further includes an internal lens 105, an optical sensor 106, a light emitting diode (LED) 107 and a solar energy module 109. The light emitting diode 107 is an internal light source within the mouse body 101. The light beams emitted from the light emitting diode 107 can be reflected by a working plane (e.g. a desk plane or a mouse pad) and received by the optical sensor 106. By moving the mouse body 101 on the working plane, a corresponding cursor control signal is issued to the computer, which is communicated with the solar powered mouse 100. The light beams emitted from the light emitting diode 107 can be employed to generate the cursor control signal. Moreover, portions of the light beams emitted from the light emitting diode 107 can pass through the internal lens 105 and then received and utilized by the solar energy module 109. Like the internal light source, the external light beams emitted from the external light sources can pass through the exterior lens 104 to be received and utilized by the solar energy module 109.

Please refer to FIG. 2 again. During operation of the solar powered mouse 100, the forefinger and the middle finger of the user can be respectively placed on the two click buttons 102 with the proviso that the exterior lens 104 adjacent to the scroll wheel 103 is not shielded by the user's fingers and palm. Under this circumstance, the external light beams can pass through the exterior lens 104 into the interior of the mouse body 101 and received by the solar energy module 109 within the mouse body 101, as can be seen in FIG. 3. In addition, the light beams emitted from the light emitting diode 107 can pass through the internal lens 105 to be received and utilized by the solar energy module 109.

Figure 4:
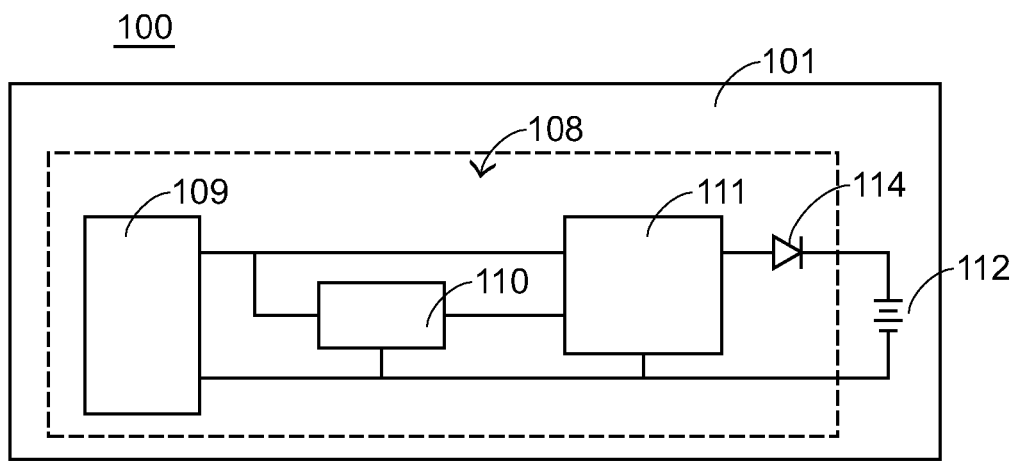
FIG. 4 is a schematic circuit block diagram illustrating a power management device of the solar powered mouse according to a first preferred embodiment of the present invention.

Hereinafter, the operations of charging the solar powered mouse with light energy (e.g. solar energy) will be illustrated with reference to FIG. 4. FIG. 4 is a schematic circuit block diagram illustrating a power management device of the solar powered mouse according to a first preferred embodiment of the present invention. As shown in FIG. 4, a secondary battery 112 is disposed within the mouse body 101 to offer electric energy required for operating the solar powered mouse 100. The secondary battery 112 is electrically connected to the power management device 108. The power management device 108 includes the solar energy module 109, a voltage detector 110, a charging module 111 and a diode 114. By the solar energy module 109, the light energy from the exterior or interior of the solar powered mouse 100 will be converted into output electricity. The voltage level Vs of the output electricity can be detected by the voltage detector 110. The voltage detector 110 has a preset voltage value Vth. By comparing the voltage level Vs of the output electricity with the preset voltage value Vth, the voltage detector 110 generates a comparing result. The voltage detector 110 is electrically connected to the charging module 111. The charging module 111 is electrically connected to the secondary battery 112 through the diode 114.

After the internal or external light beams are absorbed by the solar energy module 109, the light energy is converted by the solar energy module 109 into electric energy, i.e. the output electricity. The output electricity is transmitted to the voltage detector 110 through the diode 114. The voltage detector 110 detects the voltage level Vs of the output electricity and compares the voltage level Vs with the preset voltage value Vth. If the voltage level Vs is greater than or equal to the preset voltage value Vth, an enabling signal is issued from the voltage detector 110 to the charging module 111. In response to the enabling signal, the charging module 111 is activated to charge the secondary battery 112. Whereas, if the voltage level Vs is smaller than the preset voltage value Vth, no enabling signal is issued. During the secondary battery 112 is charged by the charging module 111, the output electricity flows through the diode 114, which is arranged between the charging module 111 and the secondary battery 112. The diode 114 allows the output electricity to flow in the direction from charging module 111 to the secondary battery 112 while preventing backflow toward the charging module 111.

The procedure of comparing the voltage level Vs with the preset voltage value Vth by the voltage detector 110 can facilitate discriminating whether the output electricity has been accumulated to a level sufficient to charge the secondary battery 112. The voltage level Vs which is smaller than the preset voltage value Vth indicates that the accumulated output electricity has not yet sufficient to charge the secondary battery 112.

In this embodiment, when the output electricity has been accumulated to a level sufficient to charge the secondary battery 112 (i.e. the condition that the voltage level Vs is greater than or equal to the preset voltage value Vth is satisfied), the output electricity is transmitted from the charging module 111 to directly charge the secondary battery 112, regardless of whether the battery capacity of the secondary battery 112 is exhausted. It is found that the secondary battery 112 is readily subject to battery aging from over charge/discharge because the charging module 111 charges the secondary battery 112 as long as the voltage level Vs of the output electricity is above the preset voltage value Vth. For minimizing over charge/discharge of the secondary battery, a further embodiment is provided.

Figure 5:
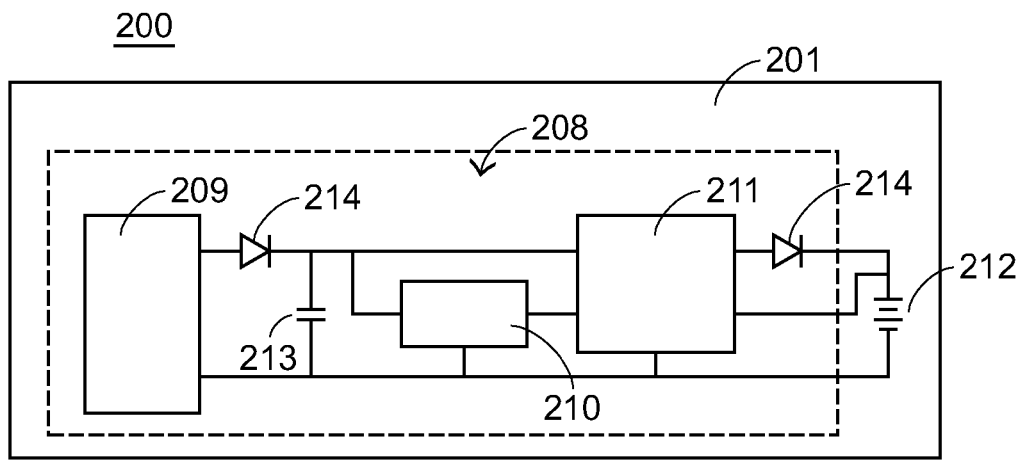
FIG. 5 is a schematic circuit block diagram illustrating a power management device of the solar powered mouse according to a second preferred embodiment of the present invention.

FIG. 5 is a schematic circuit block diagram illustrating a power management device of the solar powered mouse according to a second preferred embodiment of the present invention. The modifications of this embodiment retain the teachings of the invention. As shown in FIG. 5, a secondary battery 212 is disposed within the mouse body 201 to offer electric energy required for operating the solar powered mouse 200. The secondary battery 212 is electrically connected to the power management device 208. This embodiment is distinguished from the first preferred embodiment by the power management device 208. As shown in FIG. 5, the solar energy module 209 is connected in parallel to a capacitor 213 through a diode 214. The capacitor 213 can be used for temporarily storing electric energy. In addition, the charging module 211 is electrically connected to the secondary battery 212 through another diode 214.

During operation of the solar powered mouse 200, the internal or external light beams passing through the lens are received by the power management device 208. The light energy is converted by the solar energy module 209 into electric energy, i.e. the output electricity. The voltage detector 210 detects the voltage level Vs of the output electricity and compares the voltage level Vs with the preset voltage value Vth. If the voltage level Vs is greater than or equal to the preset voltage value Vth, an enabling signal is issued from the voltage detector 210 to the charging module 211. In response to the enabling signal, the charging module 211 is activated to charge the secondary battery 212. Whereas, if the voltage level Vs is smaller than the preset voltage value Vth, no enabling signal is issued. In this embodiment, a predetermined battery capacity value has been previously stored in the charging module 211. Since the charging module 211 is electrically connected to the secondary battery 212, the surplus capacity of the secondary battery 212 can also be detected by the charging module 211. In a case that the charging module 211 is activated and the surplus capacity of the secondary battery 212 is smaller than the predetermined battery capacity value, the charging module 211 will charge the secondary battery 212. On the other hand, if the surplus capacity of the secondary battery 212 is greater than or equal to the predetermined battery capacity value, it is meant that the surplus capacity of the secondary battery 212 is enough and the secondary battery 212 needs not to be charged. Under this circumstance, the power consumption of the charging module 211 is minimized and the output electricity is temporarily stored in the capacitor 213. Until the surplus capacity of the secondary battery 212 is smaller than the predetermined battery capacity value, the output electricity temporarily stored in the capacitor 213 will charge the secondary battery 212. Due to the two diodes 214 of the power management device 208, the current flow is unidirectional.

As previously described, the conventional solar powered mouse can not work until the accumulated electric energy of the solar energy module is sufficient to drive the solar powered mouse. It is very troublesome for the user to operate the conventional solar powered mouse because the electric energy fails to be continuously supplied. In contrast, since the solar powered mouse of the present invention uses the electric energy of the battery as the main energy source and the solar energy as the auxiliary energy source, the present solar powered mouse can normally work if the solar energy is insufficient.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A solar powered mouse comprising:
   a mouse body;
   an optical sensor for generating a cursor control signal by sensing movement of said mouse body;
   an internal light source for emitting internal light beams to be received by said optical sensor;
   a secondary battery for powering said mouse;
   a lens arranged on said mouse body such that external light beams enter an interior of said mouse body through said lens;
   a power management device disposed within said mouse body for charging said secondary battery, and comprising:
      a solar energy module disposed to receive said internal light beams and said external light beams, so that said internal light beams and said external light beams are converted by said solar energy module into output electricity;
      a voltage detector for detecting a voltage level Vs of said output electricity; and
      a charging module electrically connected to said voltage detector, wherein said charging module is activated to charge said secondary battery with said output electricity if said voltage level Vs is greater than or equal to a preset voltage value Vth; and
   an internal lens to direct a portion of said internal light beams to said solar energy module.

2. The solar powered mouse according to claim 1 further comprising two click buttons and a scroll wheel between said two click buttons, wherein said lens is arranged adjacent to said scroll wheel.

3. The solar powered mouse according to claim 1 further comprising a diode, which is interconnected between said charging module and said secondary battery, for allowing unidirectional current flow between said charging module and said secondary battery.

4. The solar powered mouse according to claim 1 wherein said internal light source is a light emitting diode (LED).

5. The solar powered mouse according to claim 1 wherein said power management device further comprises a capacitor between said solar energy module and said voltage detector.

6. The solar powered mouse according to claim 5 wherein said charging module charges said capacitor with said output electricity if the surplus capacity of said secondary battery is greater than or equal to a predetermined battery capacity value, and said charging module charges said secondary battery with said output electricity if the surplus capacity of said secondary battery is smaller than said predetermined battery capacity value.

* * * * *